United States Patent
Fukui et al.

(10) Patent No.: US 10,287,652 B2
(45) Date of Patent: May 14, 2019

(54) METHOD FOR RECOVERING CALCIUM-CONTAINING SOLID COMPONENT FROM STEELMAKING SLAG AND RECOVERED SOLID COMPONENT

(71) Applicant: NISSHIN STEEL CO., LTD., Tokyo (JP)

(72) Inventors: Yasushi Fukui, Osaka (JP); Akihiro Asaba, Osaka (JP); Shoichi Matsuo, Osaka (JP); Masaya Yamamoto, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/560,711

(22) PCT Filed: Mar. 16, 2016

(86) PCT No.: PCT/JP2016/001492
§ 371 (c)(1),
(2) Date: Sep. 22, 2017

(87) PCT Pub. No.: WO2016/152099
PCT Pub. Date: Sep. 29, 2016

(65) Prior Publication Data
US 2018/0051357 A1  Feb. 22, 2018

(30) Foreign Application Priority Data
Mar. 23, 2015 (JP) .................. 2015-059468

(51) Int. Cl.
| | |
|---|---|
| C22B 7/00 | (2006.01) |
| C22B 7/04 | (2006.01) |
| C01F 11/18 | (2006.01) |
| C04B 5/00 | (2006.01) |
| C21C 5/28 | (2006.01) |
| C04B 5/06 | (2006.01) |

(52) U.S. Cl.
CPC .............. *C22B 7/04* (2013.01); *C01F 11/18* (2013.01); *C04B 5/00* (2013.01); *C04B 5/06* (2013.01); *C21C 5/28* (2013.01); *C22B 7/008* (2013.01); *Y02W 30/542* (2015.05)

(58) Field of Classification Search
CPC ........................ C22B 7/008; C22B 7/04; C01F 11/18–11/182; C04B 5/06
USPC .......................................... 423/158–161, 165
See application file for complete search history.

(56) References Cited

U.S. PATENT DOCUMENTS

| | | | | |
|---|---|---|---|---|
| 4,225,565 A | * | 9/1980 | Marukawa | ................ C22B 7/04 423/189 |
| 5,466,275 A | * | 11/1995 | More | ........................ C21C 1/02 75/10.46 |
| 5,569,314 A | * | 10/1996 | Mikhail | .................... C04B 5/00 423/432 |
| 6,354,108 B1 | * | 3/2002 | Toyota | ..................... C04B 5/06 588/251 |
| 9,783,418 B2 | * | 10/2017 | Matsuo | ................... C01B 25/01 |
| 2010/0239467 A1 | * | 9/2010 | Constantz | ................. C01F 5/24 422/168 |
| 2011/0139628 A1 | | 6/2011 | Teir et al. | |
| 2015/0125367 A1 | * | 5/2015 | Wyrsta | .................... C22B 3/001 423/165 |

FOREIGN PATENT DOCUMENTS

| | | |
|---|---|---|
| JP | S55-100220 A | 7/1980 |
| JP | 2010-270378 A | 12/2010 |
| JP | 2011-016710 * | 1/2011 |
| JP | 2013-142046 A | 7/2013 |
| KR | 10-0998916 B1 | 12/2010 |
| WO | 2014/005227 * | 1/2014 |

OTHER PUBLICATIONS

Translation of JP 55-100220, Jul. 1980.*
Translation of KR-2010-0998916, Dec. 2010.*
Translation of JP 2011-016710, Jan. 2011.*
Translation of JP 55-100220. (Year: 1980).*
International Search Report from International Application No. PCT/JP2016/001492 dated Jun. 14, 2016.
Masao Nakagawa, "Current Status on the Effective Utilization of Iron and Steelmaking Slag" Lecture Text of Nos. 205 and 206 Nishiyama Memorial Technical Course, The Iron and Steel Institute of Japan, Jun. 2011, p. 25-56.
"Kankyo-shizai Tecckou suragu (Environmental Materials, Iron and Steel Slag)" Nippon Slag Association, Jan. 2014.
Takayuki Futatsuka et al., "Dissolution Behavior of Elements in Steelmaking Slag into Artificial Seawater" Tetsu-to-Hagane (Iron and Steel) vol. 89, No. 4, Jan. 2014, p. 382-387.

* cited by examiner

*Primary Examiner* — Steven J Bos
(74) *Attorney, Agent, or Firm* — Brundidge & Stanger, P.C.

(57) ABSTRACT

The purpose of the present invention is to provide a method for recovering calcium-containing solid components from steelmaking slag, with which it is possible to easily increase the calcium recovery rate. With the method, steelmaking slag is immersed in an aqueous solution containing carbon dioxide, and calcium in the steelmaking slag is made to leach out into the aqueous solution. Next, the immersed steelmaking slag is removed from the aqueous solution, and, subsequently, the pH of the aqueous solution is increased. When solid components precipitated by doing so are recovered, it is possible to recover solid components containing 20% or more by mass in terms of calcium atoms.

8 Claims, 6 Drawing Sheets

METHOD FOR RECOVERING CALCIUM-CONTAINING SOLID COMPONENT FROM STEELMAKING SLAG AND RECOVERED SOLID COMPONENT

TECHNICAL FIELD

The present invention relates to a method for recovering a solid component containing calcium from steelmaking slag, and the solid component recovered by the recovery method.

BACKGROUND ART

Steelmaking slag (such as converter slag, pretreatment slag, secondary refining slag and electric furnace slag) generated in a steelmaking process is known to contain oxides of, e.g., phosphorus (P), calcium (Ca), iron (Fe), silicon (Si), manganese (Mn), magnesium (Mg), and aluminum (Al). Specifically, calcium exists in steelmaking slag as remaining quicklime (CaO) which is fed during a steelmaking process, free lime precipitated from the quicklime during a solidification period, or as calcium hydroxide ($Ca(OH)_2$) or calcium carbonate ($CaCO_3$) each generated from the free lime reacting with water vapor or carbon dioxide in the air.

Steelmaking slag is used in various applications, such as cement materials, road base materials for roads, construction materials and fertilizers (see NPLs 1 to 3). However, free lime contained in steelmaking slag should be handled with care since it inflates products or is eluted as high alkaline water upon contact with water (see NPL 1).

Calcium is used in a sintering process of iron making as calcium carbonate. Calcium oxide obtained by calcining calcium is used in a steelmaking process. Calcium hydroxide obtained by adding water to calcium oxide is used as a neutralizer for, e.g., acids in a draining process. Therefore, when calcium can be recovered from steelmaking slag generated in an iron-making process, calcium can be reused to reduce iron-making cost.

Accordingly, attempts to recover calcium from steelmaking slag are being made (see PTLs 1 to 3).

PTL 1 describes a method in which carbon dioxide is blown into an aqueous solution having calcium eluted from converter slag to allow calcium carbonate to settle out and recover the same. During this procedure, the lower limit of the pH is maintained at about 10 for suppressing the generation of calcium hydrogen carbonate which is highly soluble in water. Although PTL 1 does not describe a specific way for maintaining the pH at 10 or more, the inventors consider that the pH is maintained at 10 or more by adjusting the amount of blown carbon dioxide during the performance of the method.

PTL 2 describes a method in which fractured steelmaking slag is separated into an iron-condensed phase and a phosphorus-condensed phase, a calcium component in the phosphorus-condensed phase is dissolved as calcium hydrogen carbonate in rinse water containing carbon dioxide dissolved therein, and then the rinse water is heated to 50 to 60° C. to allow calcium hydrogen carbonate therein to settle out as calcium carbonate.

PTL 3 describes a method in which calcium compounds are eluted from steelmaking slag by multiple process. PTL 3 describes the recovery method as capable of preferentially eluting $2CaO/SiO_2$ phase and phosphorus in a state of solid solution therein by immersing steelmaking slag (pretreatment slag) several times in water containing carbon dioxide blown therein.

CITATION LIST

Patent Literature

PTL 1
Japanese Patent Application Laid-Open No. S55-100220
PTL 2
Japanese Patent Application Laid-Open No. 2010-270378
PTL 3
Japanese Patent Application Laid-Open No. 2013-142046

Non-Patent Literature

NPL 1
Masao NAKAGAWA "Current Status on the Effective Utilization of Iron and Steelmaking Slag" Lecture Text of Nos. 205 and 206 NISHIYAMA Memorial Technical Course, The Iron and Steel Institute of Japan, June, 2011, p. 25-56
NPL 2
"Kankyo-shizai Tecckou suragu (Environmental Materials, Iron and Steel Slag)" Nippon Slag Association, January, 2014
NPL 3
Takayuki FUTATSUKA et al., "Dissolution Behavior of Elements in Steelmaking Slag into Artificial Seawater" Tetsu-to-Hagane (Iron and Steel) Vol. 89, No. 4, January, 2014, P. 382-387

SUMMARY OF INVENTION

Technical Problem

As described above, recovery of calcium from steelmaking slag provides various advantages, and thus there is always a demand for increasing a recovery rate of calcium from steelmaking slag.

In the method described in PTL 1, a higher amount of blown carbon dioxide leads to a pH lower than 10, and a lower amount thereof leads to decrease in the precipitation amount of calcium. Therefore, the amount of blown carbon dioxide should be precisely adjusted for increasing a recovery rate of calcium, which makes a recovery process complicated and increases recovery cost.

The method described in PTL 2 can recover calcium in a phosphorus-condensed phase, but not calcium in an iron-condensed phase. Therefore, another process of recovering calcium in the iron-condensed phase is necessary for increasing a recovery rate of calcium from steelmaking slag, which makes a recovery process complicated and increases recovery cost.

In the method described in PTL 3, it is necessary to further increase the number of processes of dissolving a calcium compound for increasing a recovery rate of calcium.

This complicates a recovery process and a process of uniting the recovered calcium compounds, and increases recovery cost.

The conventional methods thus have a disadvantage in that any effort for increasing a recovery rate of calcium results in a complicated recovery process and increased recovery cost.

In view of the above disadvantage, the present invention is made with an object to provide a method for recovering a solid component containing calcium from steelmaking slag, which can easily increase a recovery rate of calcium, and the solid component containing calcium obtained by the recovery method.

Solution to Problem

A first aspect of the present invention relates to a method for recovering a solid component containing calcium as follows.

[1] A method for recovering a solid component containing calcium from steelmaking slag, including:
immersing the steelmaking slag in an aqueous solution containing carbon dioxide;
separating the immersed steelmaking slag and the aqueous solution;
increasing a pH of the aqueous solution separated from the steelmaking slag; and
recovering the solid component containing calcium, the solid component being precipitated in the aqueous solution having the increased pH.

[2] The method according to [1], in which the increasing the pH includes increasing the pH of the aqueous solution by 0.2 or more.

[3] The method according to [1] or [2], in which the increasing the pH includes increasing the pH of the aqueous solution by adding an alkaline substance into the aqueous solution.

[4] The method according to [3], in which the adding the alkaline substance includes: adding slag-immersed water obtainable by immersing steelmaking slag in water to the aqueous solution.

[5] The method according to [4], further including:
prior to the immersing the steelmaking slag in the aqueous solution, obtaining slag-immersed water by immersing in water the steelmaking slag to be immersed in the aqueous solution, thereby the slag-immersed water to be added is obtained.

[6] The method according to any one of [1] to [5], further including, removing carbon dioxide from the aqueous solution, in which the removing is performed after the separating and prior to the increasing the pH, during the increasing the pH, or after the increasing the pH and prior to the recovering.

[7] The method according to [6], in which the removing includes removing carbon dioxide from the aqueous solution by introducing, into the aqueous solution, a gas having a partial pressure of carbon dioxide lower than an equilibrium pressure of carbon dioxide in the aqueous solution.

[8] The method according to [6], in which the removing includes removing carbon dioxide from the aqueous solution by placing the aqueous solution under a reduced-pressure environment.

[9] The method according to [6], in which the removing includes removing carbon dioxide from the aqueous solution by heating the aqueous solution.

[10] The method according to any one of [6] to [9], further including, during the removing carbon dioxide, recovering a solid component precipitated before the pH of the aqueous solution increases by 1.0.

A second aspect of the present invention relates to a solid component as follows.

[11] A solid component recovered by the method according to any one of [1] to [10] including:
20 mass % or more of calcium atoms based on a total mass of the solid component.

Advantageous Effects of Invention

The present invention provides a method for recovering a solid component containing calcium from steelmaking slag, which has a high recovery rate of calcium, and low recovery cost since the method can be performed easily. The present invention also provides a solid component containing calcium, which is obtained by the recovery method.

DESCRIPTION OF EMBODIMENTS

Hereinafter, exemplary modes of specific recovery methods of the present invention will be described.

1. First Recovery Method

Figure 1:
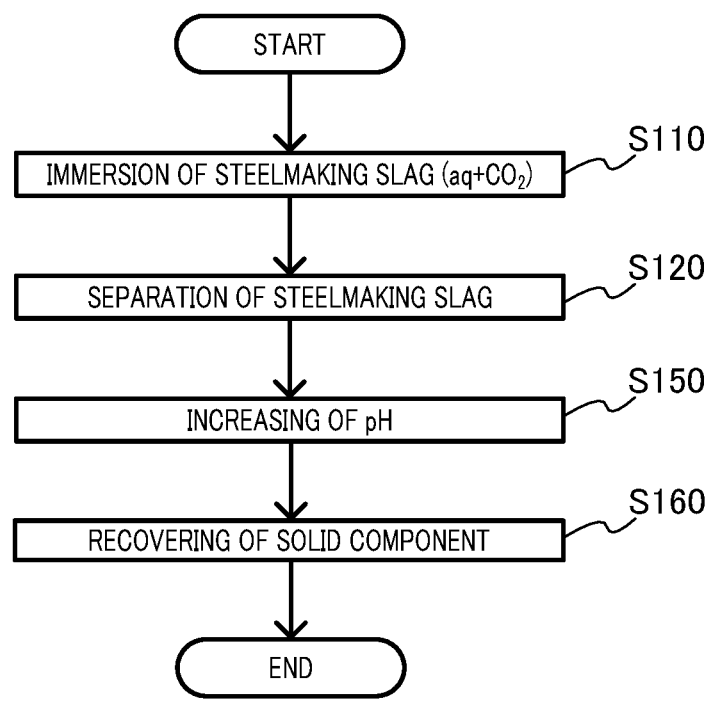
FIG. 1 is a flowchart of a first recovery method of the present invention.

FIG. 1 is a flowchart of a recovery method of a solid component containing calcium (hereinafter also referred to as "first recovery method") according to an embodiment of the present invention. As illustrated in FIG. 1, the recovery method of a solid component containing calcium according to the embodiment includes steps of: immersing steelmaking slag in an aqueous solution containing carbon dioxide (Step S110); separating the immersed steelmaking slag and the aqueous solution (Step S120); increasing the pH of the aqueous solution separated from the steelmaking slag (Step S150); and recovering a solid component precipitated in the aqueous solution (Step S160).

The first recovery method can recover a solid component containing a high amount of calcium derived from steelmaking slag in a simple manner compared to the conventional methods. The aqueous solution after being used for the first recovery method contains only low contents of calcium, manganese, phosphorus and the like. Therefore, waste water treatment can become simpler or unnecessary, thereby suppressing the waste water treatment cost.

[First Step: Immersion of Steelmaking Slag in Aqueous Solution Containing Carbon Dioxide]

In this step, steelmaking slag is immersed in an aqueous solution containing carbon dioxide (hereinafter also referred to simply as "aqueous solution") to elute calcium present in the steelmaking slag into the aqueous solution (Step S110).

In the step, the steelmaking slag may be immersed in water in which carbon dioxide is previously dissolved, or the steelmaking slag may be immersed in water and then carbon dioxide may be dissolved in the water. During the immersion of the steelmaking slag in the aqueous solution, it is preferred that the steelmaking slag and the aqueous solution are stirred for accelerating reactions.

Carbon dioxide can be dissolved in water by, e.g., bubbling (blowing) of gas containing carbon dioxide. It is preferred that 30 ppm or more of carbon dioxide is dissolved in the aqueous solution for increasing elution of calcium from the steelmaking slag.

The gas containing carbon dioxide may be pure carbon dioxide gas, or a gas containing carbon dioxide and components such as oxygen and nitrogen in addition. Examples of the gases containing carbon dioxide include an exhaust gas after combustion, and a mixed gas of carbon dioxide, air and water vapor. From the perspective of increasing elution of a calcium compound (e.g., calcium silicate) from the steelmaking slag into the aqueous solution by increasing the concentration of carbon dioxide in the aqueous solution, the gas containing carbon dioxide preferably contains carbon dioxide in high concentration (e.g. 90%).

During the elution of calcium, the amount of carbon dioxide in the aqueous solution decreases as calcium dissolves since calcium reacts with carbon dioxide and forms water-soluble calcium hydrogen carbonate. Therefore, it is preferred to keep providing carbon dioxide to the aqueous solution after the steelmaking slag is immersed.

The steelmaking slag may be any steelmaking slag discharged during a steelmaking process. Examples of the steelmaking slag include converter slag, preliminary treatment slag, secondary refining slag and electric furnace slag.

Steelmaking slag may be used as discharged in the steelmaking process, or as fractured after the discharge. In the step, the maximum particle diameter of the fractured steelmaking slag is preferably 1,000 μm or less for enlarging the contact area between the steelmaking slag and an aqueous solution to enhance the elution of calcium into the aqueous solution. The steelmaking slag can be fractured until the maximum particle diameter thereof is in the above range using a conventional crusher. From the perspective of further enlarging the contact area between the steelmaking slag and the aqueous solution, the steelmaking slag may be pulverized until the maximum particle diameter thereof becomes 100 μm or less. The steelmaking slag can be pulverized until the maximum particle diameter thereof is in the above range using, e.g., a roller mill or ball mill.

From the perspective of preventing unnecessary elution of iron into the aqueous solution, metal iron may be removed from the steelmaking slag prior to the immersion. Metal iron can be removed from the steelmaking slag using a conventional magnetic sorter. Metal iron is removed preferably after the steelmaking slag is fractured, and more preferably after the steelmaking slag is pulverized, for increasing the removal efficiency of metal iron.

The amount of the slag in an aqueous solution is preferably 1 g/L or more or 100 g/L or less, and more preferably 2 g/L or more or 40 g/L or less for satisfactorily eluting calcium present in the steelmaking slag. The immersion is performed preferably for three minutes or more, and more preferably for five minutes or more, for satisfactorily eluting calcium present in the steelmaking slag.

[Second Step: Separation of Steelmaking Slag and Aqueous Solution]

In this step, the aqueous solution (supernatant) having phosphorus and calcium dissolved therein is separated from the steelmaking slag (Step S120). The separation may be performed by a conventional method. Examples of separating methods include filtration, and a method in which the steelmaking slag settles out by allowing the aqueous solution to stand. In the case where the slag settles out, only the supernatant may further be recovered, or subsequent steps may be performed only to the supernatant in a two-component system containing the supernatant and the steelmaking slag that settles out as long as a solid component precipitated in a step described below is not mixed with the steelmaking slag.

[Third Step: Increasing of pH of Aqueous Solution]

In this step, the pH of the aqueous solution separated from the steelmaking slag is increased (Step S150). Increasing the pH of the aqueous solution can precipitate a solid component containing calcium in the aqueous solution. The amount of hydrogen ions ($H^+$) in the aqueous solution decreases when the pH increases, and thus the equilibrium in the equilibrium equation (Equation 1) described below moves in such a direction that a hydrogen carbonate ion ($HCO_3^-$) is separated into a hydrogen ion ($H^+$) and a carbonate ion ($CO_3^{2-}$). In the step, it is considered that calcium is precipitated due to the increased carbonate ions becoming poorly-soluble calcium carbonate ($CaCO_3$) by reacting with calcium ions.

$$HCO_3^- \leftrightarrows H^+ + CO_3^{2-} \qquad \text{(Equation 1)}$$

When the precipitation of calcium starts, cloudiness caused by calcium carbonate is generated in the aqueous solution. The increasing of the pH of the aqueous solution is sufficient up until the cloudiness can be confirmed by visual observation. From the perspective of further increasing the recovery rate of calcium by precipitating calcium more sufficiently, increasing of the pH of the aqueous solution separated from the steelmaking slag in the second step (Step S120) is preferably by 0.2 or more, more preferably by 0.3 or more, still more preferably by 1.0 or more, even more preferably by 1.5 or more, and particularly preferably by 2.0 or more.

The third step is preferably performed while measuring the pH of the aqueous solution. The pH of the aqueous solution can be measured by a conventional glass electrode method.

The pH of the aqueous solution can be increased by, e.g., adding an alkaline substance into the aqueous solution. Examples of the alkaline substances that can be fed into the aqueous solution include calcium hydroxide, ammonia and sodium hydroxide. Calcium hydroxide, ammonia or sodium hydroxide can be fed by dissolving the same in water, and adding the resultant solution to the above aqueous solution. Calcium hydroxide, ammonia and sodium hydroxide each may be a commercial product, or a substance contained in a liquid such as a waste fluid. In the case of adding calcium hydroxide contained in a waste fluid, a waste fluid generated during the production of acetylene by reacting, e.g., calcium carbide with water can be added to the above aqueous solution. In the case of adding calcium hydroxide, slag-immersed water generated by immersing steelmaking slag in water may be fed into the above aqueous solution. The slag-immersed water may be obtained by immersing the steelmaking slag from which calcium is to be recovered in water prior to the first step (Step S110) (refer to the second recovery method described below), or by immersing another steelmaking slag in water.

It is to be noted that the pH of the aqueous solution is increased by removing carbon dioxide as in the below described sixth step (Step S130). However, the present invention does not include removal of carbon dioxide in the third step. In the third step of present invention, increasing of the pH of the aqueous solution by, e.g., adding an alkaline substance can increase the recovery rate of calcium more than the removal of carbon dioxide.

Increasing the pH of the aqueous solution also causes precipitation of elements contained in the aqueous solution, such as iron, manganese and phosphorus as the solid component. Accordingly, the aqueous solution after the removal of calcium allows waste water treatment to become simpler or unnecessary, thereby suppressing the waste water treatment cost.

[Fourth Step: Recovering of Solid Component]

In this step, a solid component precipitated in the third step is recovered (Step S160). The precipitated solid component can be recovered by a conventional method such as vacuum filtration or pressure filtration. The solid component contains calcium derived from steelmaking slag.

2. Second Recovery Method

Figure 2:
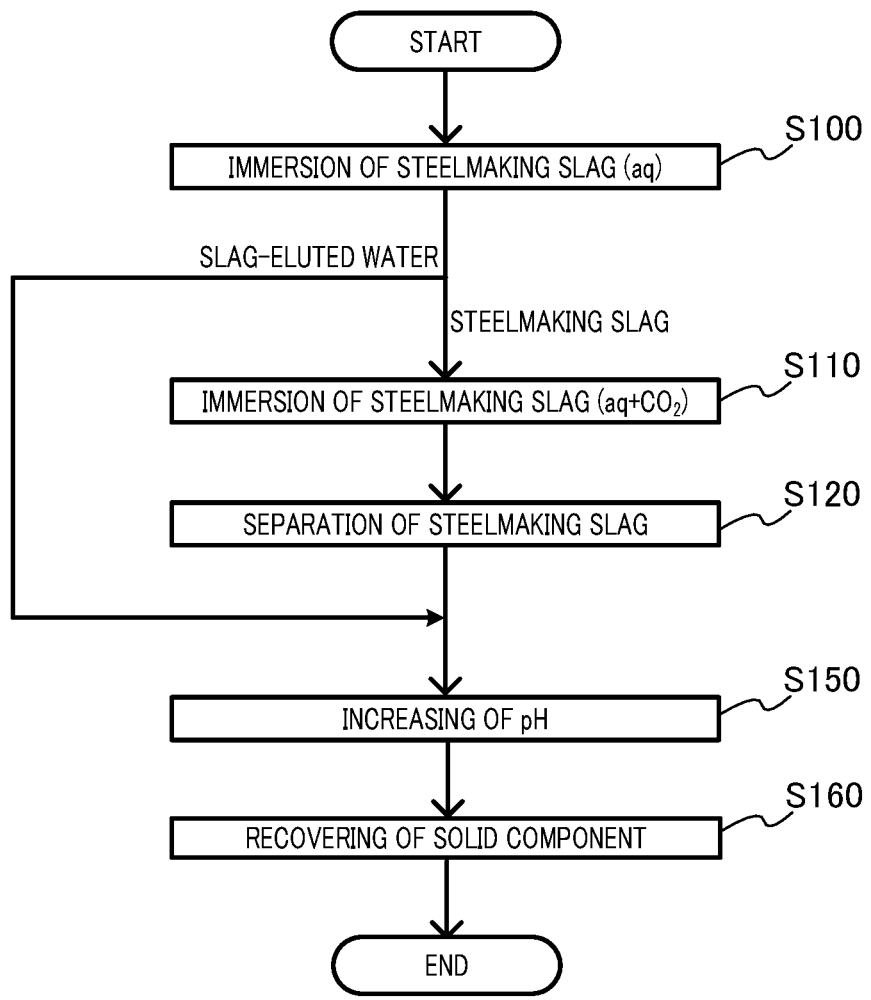
FIG. 2 is a flowchart of a second recovery method of the present invention.

FIG. 2 is a flowchart of a recovery method of calcium (hereinafter also referred to as "second recovery method") according to another embodiment of the present invention. The second recovery method further includes, in the first recovery method, a fifth step (Step S100) of obtaining slag-immersed water by immersing steelmaking slag in water prior to the first step (Step S110), and adding of the slag-immersed water obtained in the fifth step into the aqueous solution in the fourth step (Step S160). Hereinafter, the description overlapping with that of the first recovery method is omitted.

The second recovery method can further increase the recovery rate of calcium from steelmaking slag.

[Fifth Step: Immersion of Steelmaking Slag in Water]

In this step, calcium is eluted into water by immersing steelmaking slag in water (Step S100). Free lime contained in the steelmaking slag is eluted into water as calcium hydroxide by a hydration reaction in the step. Eluting free lime in advance in the step can further increase the recovery rate of calcium from the steelmaking slag.

The slag-immersed water with eluted calcium therein contains a high amount of calcium hydroxide and thus is strongly alkaline. Therefore, the slag-immersed water can be fed into aqueous solution for increasing the pH of the aqueous solution in the fourth step (Step S160). Adding of the slag-immersed water in the fourth step (Step S160) makes possible for waste water treatment to become unnecessary, and thus the calcium recovery cost can be suppressed. During this procedure, calcium ions in the slag-immersed water react with hydrogen carbonate ions in the aqueous solution to form calcium carbonate to be precipitated under alkaline conditions. This calcium contained in the slag-immersed water is thus also recovered in the fourth step (Step S160) after the precipitation, and the recovery rate of calcium is further increased. Further, calcium in the slag-immersed water and calcium in the above described aqueous solution can both be recovered as the same solid component in one step, and thus a process of uniting the recovered calcium compounds becomes unnecessary.

The steelmaking slag immersed in water may be the same steelmaking slag to be immersed in the aqueous solution in the first step (Step S110), or another steelmaking slag. Using the same steelmaking slag as shown in FIG. 2 can further increase the recovery rate of calcium from this steelmaking slag. Using another steelmaking slag can further improve work efficiency by performing the fifth step and another step simultaneously.

3. Third Recovery Method

Figure 3:
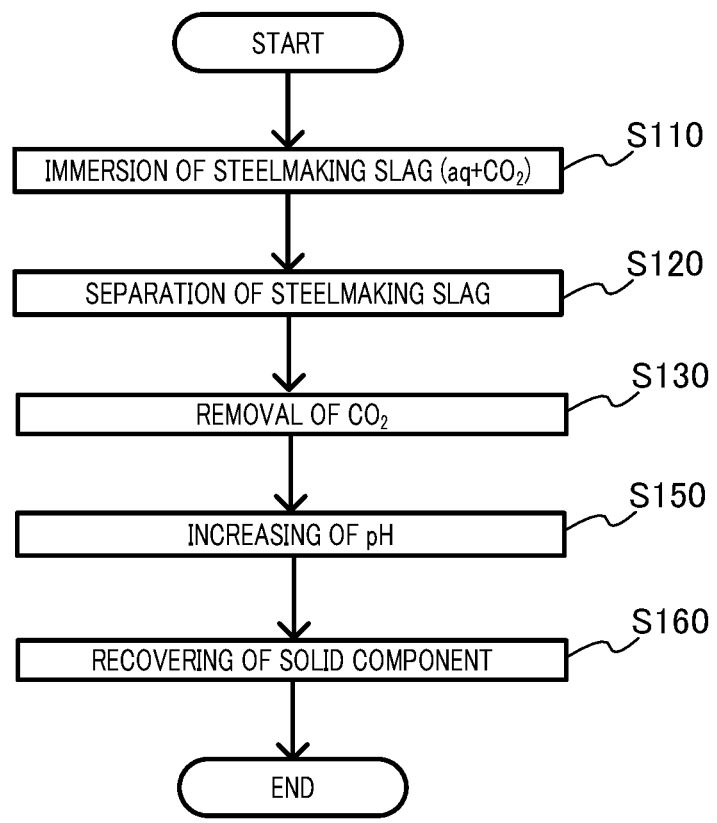
FIG. 3 is a flowchart of a third recovery method of the present invention.

FIG. 3 is a flowchart of a recovery method of calcium (hereinafter also referred to as "third recovery method") according to yet another embodiment of the present invention. The third recovery method further includes, in the first recovery method, a sixth step (Step S130) of removing carbon dioxide from the aqueous solution between the second step (Step S120) and the fourth step (Step S160). Hereinafter, the description overlapping with that of the first recovery method is omitted.

The third recovery method can reduce the amount of an alkaline substance to be fed, and thus can recover calcium more easily and at lower cost.

[Sixth Step: Removal of Carbon Dioxide]

In this step, carbon dioxide is removed (Step S130) from the aqueous solution separated from the steelmaking slag in the second step (Step S120). Removal of carbon dioxide causes precipitation of calcium eluted into the aqueous solution in the first step (Step S110). Combining the removal of carbon dioxide (sixth step, Step S130) and the increasing of the pH of the aqueous solution (third step, Step S150) thus can further increase the recovery rate of calcium. Examples of calcium compounds to be precipitated in this procedure include calcium carbonate, calcium carbonate hydrate and calcium hydroxide.

Any method may be used for removing carbon dioxide from the aqueous solution. Examples of the methods for removing carbon dioxide include (1) gas introduction, (2) pressure reduction and (3) heating.

(1) Gas Introduction

Carbon dioxide can be removed from the aqueous solution by introducing into the aqueous solution a gas having a partial pressure of carbon dioxide lower than the equilibrium pressure of carbon dioxide in the aqueous solution to replace dissolved carbon dioxide by the introduced gas, or to diffuse (transfer) carbon dioxide into bubbles of the introduced gas. The gas to be introduced into the aqueous solution preferably has low reactivity to water, and may be an inorganic gas or an organic gas as long as the reactivity to water is low. An inorganic gas is more preferred since the possibility of combustion or explosion is low when the gas leaks outside. Examples of the inorganic gases include nitrogen, oxygen, hydrogen, argon, helium and mixed gases thereof. An example of the mixed gas is air of the environment where the step is performed, which contains nitrogen and oxygen in an approximate ratio of 4 to 1. Examples of the organic gases include methane, ethane, ethylene, acetylene and propane. On the other hand, gases reactive to water (such as chlorine and sulfur dioxide) are not preferred since ions (such as chlorine ions and sulfate ions), which are formed by the introduction of these gases into the aqueous solution, form salts with calcium eluted into water, thereby reducing the precipitation amount of calcium.

(2) Pressure Reduction

Under the pressure environment of about one atmospheric pressure (about 100 kPa) or less, the solubility of carbon dioxide decreases when the pressure applied on the aqueous solution decreases. Carbon dioxide thus can be removed from the aqueous solution by placing the aqueous solution under a reduced-pressure environment. For example, carbon dioxide can be removed by putting the aqueous solution into an airtight container and evacuating air (degassing) of the container using, e.g., a pump to allow the container to have a reduced-pressure atmosphere. From the perspective of further increasing the removal amount of carbon dioxide, applying of ultrasonic waves to the aqueous solution or stirring of the aqueous solution may be simultaneously performed with the pressure reduction.

(3) Heating

Under the pressure environment of about one atmosphere (about 100 kPa) or less, the solubility of carbon dioxide decreases when the temperature of the aqueous solution increases. Carbon dioxide thus can be removed from the aqueous solution by heating the aqueous solution. From the perspective of lowering heating costs, the aqueous solution is preferably heated to a temperature within such a range that the vapor pressure of water does not exceed the pressure in the atmosphere. For example, when the pressure in the atmosphere is one atmospheric pressure, the heating temperature is preferably less than 100° C. When the aqueous solution is heated, not only is carbon dioxide removed, the solubility of a calcium compound (calcium carbonate) also decreases, and thus calcium can be precipitated more easily.

The above methods (1) to (3) may be performed in combination for further increasing the removal amount of carbon dioxide. The most suitable combination can be selected in view of, for example, a delivery system of gas or heat, a site location, or availability of by-product gas in a factory.

For example, while keeping the gas introduction into the aqueous solution, air is evacuated more than the introduction amount of gas to allow the pressure to become a reduced-pressure atmosphere. In such a manner, the gas introduction can provide effects of removing carbon dioxide and stirring, and the pressure reduction of the aqueous solution can provide an additional effect of accelerating removal of carbon dioxide. Thus, carbon dioxide can be effectively removed. During this procedure, heating in addition can further accelerate removal effects of carbon dioxide. Since the additive effects of the gas introduction into the aqueous solution and pressure reduction of the aqueous solution can easily remove carbon dioxide, the heating temperature is not necessarily high, and thus heating costs can be reduced.

The sixth step (Step S130) may be performed prior to the third step (between the second step (Step S120) and the third step (Step S150)), simultaneously with the third step (Step S150), or after the third step (between the third step (Step S150) and the fourth step (Step S160)). Slag-immersed water cannot be obtained in a large amount, and thus a sufficient amount of slag-immersed water to be fed in the third step (Step S150) for the precipitation of calcium may not be obtained in some cases in the first or second recovery method. However, performing the sixth step (Step S130) prior to the third step (Step S150) enables the recovery rate of calcium to further increases even when only a small amount of slag-immersed water is used.

4. Fourth Recovery Method

Figure 4:
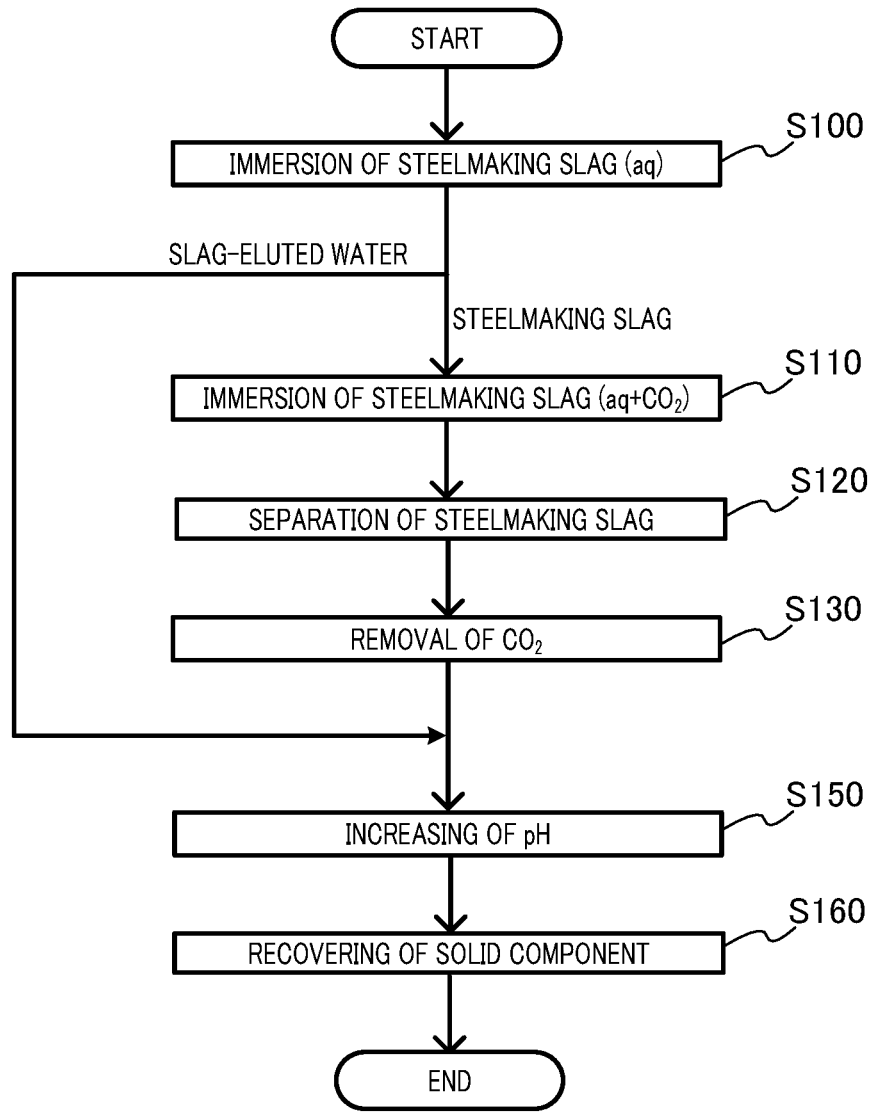
FIG. 4 is a flowchart of a fourth recovery method of the present invention.

FIG. 4 is a flowchart of a recovery method of calcium (hereinafter also referred to as "fourth recovery method") according to yet another embodiment of the present invention. The fourth recovery method further includes, in the second recovery method, a sixth step (Step S130) of removing carbon dioxide from the aqueous solution between the second step (Step S120) and the fourth step (Step S160). The sixth step can be performed in the same manner as in the third recovery method, and thus the overlapping description is omitted.

The fourth recovery method can provides both the effect of the second recovery method by which the recovery rate of calcium further increases, and the effect of the third recovery method by which calcium can be recovered calcium more easily and at lower cost.

5. Fifth Recovery Method

Figure 5:
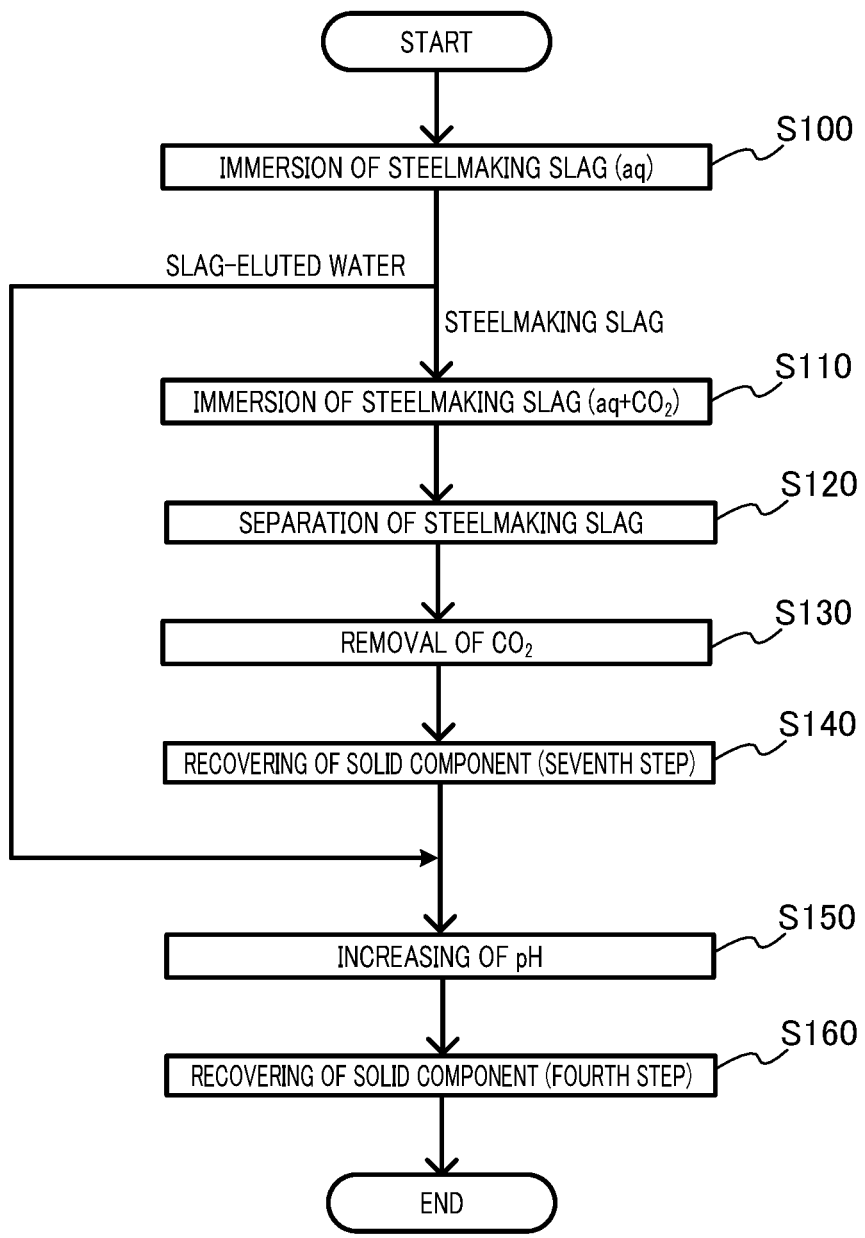
FIG. 5 is a flowchart of a fifth recovery method of the present invention.

FIG. 5 is a flowchart of a recovery method of calcium (hereinafter also referred to as "fifth recovery method") according to yet another embodiment of the present invention. The fifth recovery method further includes, in the third or fourth recovery method, a seventh step (Step S140) of recovering a solid component during the sixth step (Step S130). FIG. 5 shows a mode further includes the seventh step (Step S140) in the fourth recovery method; however, the third recovery method may also include the seventh step (Step S140). Hereinafter, the description overlapping with that of the third or fourth recovery method is omitted The fifth recovery method can separately obtain a solid component containing a phosphorus compound in a large amount, and a solid component containing a phosphorus compound in a small amount.

[Seventh Step: Recovering of Solid Component]

In this step, a solid component precipitated in the sixth step is recovered (Step S140).

In the sixth step (Step S130), phosphorus in the aqueous solution is precipitated along with calcium by removing carbon dioxide from the aqueous solution. Examples of phosphorus compounds to be precipitated include calcium phosphate, calcium hydrogen phosphate and hydroxyapatite.

During this procedure, since phosphorus is precipitated more easily than calcium, the content ratio of phosphorus in a solid component (hereinafter also referred to as "early stage precipitate") precipitated in the early stage in the sixth step (Step S130) is higher, and the content ratio of phosphorus in a solid component (hereinafter also referred to as "later stage precipitate") precipitated later is lower. Therefore, the solid component with a higher phosphorus ratio (in the seventh step) and the solid component with a lower phosphorus ratio (in the fourth step) can be recovered separately by recovering the early stage precipitate during the sixth stage.

The phosphorus compounds recovered from steelmaking slag can be reused as a phosphorus source. Therefore, recovery of the solid component with a high content of the phosphorus compounds enables easy reuse of phosphorus. Although a calcium compound recovered from steelmaking slag can be reused as an iron-making material, produced iron would become brittle when the iron-making material contains a phosphorus compound. The content of the phosphorus compounds in the solid component for reuse as an iron-making material is thus preferably low. Therefore, when a solid component containing a phosphorus compound in a large amount, and a solid component containing a phosphorus compound in a small amount are separately obtained from the aqueous solution containing phosphorus and calcium, refining of the recovered solid component becomes easier or unnecessary, and also the quality of a product made from the recovered solid component can be further improved.

As described above, the pH of the aqueous solution increases by the removal of carbon dioxide in the sixth step (Step S130). During this procedure, a large portion of phosphorus is precipitated before the pH of the aqueous solution increases by 1.0. From the perspective of further increasing the content ratio of phosphorus in the early stage precipitate and that of calcium in the later stage precipitate, the seventh step (Step S140) is performed in the sixth step before the pH increases by preferably 1.0, more preferably 0.6, and still more preferably 0.4.

6. Recovered Solid Component

A solid component recovered by the fourth step (Step S160) in any one of the first to fifth recovery methods of the present invention contains 20 mass % or more of calcium atoms based on the total mass of the solid component. Calcium is contained in the solid component in the form of, e.g., calcium carbonate, calcium hydrogen carbonate and calcium hydroxide. The calcium content in the solid component can be determined by IPC optical emission spectrometry.

The calcium content of this solid component is high, and thus the following calcium recovery is easy. The solid component can be suitably reused as an iron-making material.

In particular, the phosphorus content of the early stage precipitate obtained by the seventh step (Step S140) in the above fifth recovery method is high, and thus the following phosphorus recovery is easy.

Further, the phosphorus content of the later stage precipitate obtained by the fourth step (Step S160) in the above fifth recovery method is low and the calcium content thereof is high, and thus the following calcium recovery is easy. The later stage precipitate can be suitably reused as an iron-making material.

7. Aqueous Solution after Recovery

The content of metal ions such as calcium, phosphorus and manganese ions is low in the aqueous solution after a solid component is recovered therefrom by the fourth step (Step S160) in any one of the first to fifth recovery methods of the present invention. The aqueous solution, in particular, has a low residual calcium concentration. Therefore, the impact on the environment due to being high alkaline is low, and clogging or the like of a pipe due to precipitation of calcium becomes less likely to occur. Accordingly, the impact on the environment caused by the discharge of the aqueous solution is low, and waste water treatment becomes unnecessary, or can be performed at low costs. The aqueous solution has a low content of metal ions, and thus can be safely reused after the recovery thereof for applications such as rinse water and cooling water in a factory.

Hereinafter, the present invention will be described more specifically with reference to examples. However, these examples do not limit the scope of present invention to the specific methods described below.

EXAMPLES

[Experiments 1 to 6]

In experiments 1 to 6, removal of carbon dioxide and recovery of a solid component were each carried out once.

Steelmaking slag having a component ratio as shown in Table 1 was prepared. The components of the steelmaking slag were measured by IPC optical emission spectrometry. The slag was pulverized using a hammer mill so that the maximum particle diameter thereof became 200 μm. The maximum particle diameter of the pulverized slag was confirmed using a laser diffraction/scattering type particle size distribution measuring device and a sieve with opening of 200 μm.

[Table 1]

TABLE 1

| Component Ratio of Slag | | | | | | | |
|---|---|---|---|---|---|---|---|
| | Component Ratio (mass %) | | | | | | |
| | Fe | Ca | Si | Mn | Mg | Al | P |
| Slag | 15.0 | 33.0 | 6.3 | 3.7 | 2.2 | 2.0 | 0.8 |

Step 1: Immersion of Steelmaking Slag in Aqueous Solution Containing Carbon Dioxide Pulverized slag (0.1 kg) was fed into 20 L of water filling a container to prepare a slag suspension. The prepared slag suspension was then stirred using an impeller for 30 minutes while carbon dioxide was blown into the slag suspension at the rate of 20 L/min. The carbon dioxide concentration at that time was 30 ppm or more.

Step 2: Separation of Steelmaking Slag and Aqueous Solution

The slag suspension after stirring was allowed to stand until the slag settled out. The supernatant was then recovered and filtered using a filter to remove floating substances (hereinafter the supernatant is referred to as "aqueous solution 1"). Table 2 shows components contained in aqueous solution 1 and the amount of each component, which were measured by IPC optical emission spectrometry. Aqueous solution 1 had a pH of 6.4.

[Table 2]

TABLE 2

| Component Ratio of Aqueous Solution 1 | | | | | | | |
|---|---|---|---|---|---|---|---|
| | Component Amount (mg/L) | | | | | | |
| | Fe | Ca | Si | Mn | Mg | Al | P |
| Aqueous Solution 1 | 20 | 890 | 160 | 26 | 16 | 0.7 | 2.6 |

Step 3-1: Precipitation of Calcium (Increasing of pH of Aqueous Solution)

While keeping the measurement of the pH of the aqueous solution by a glass electrode method, the pH of the aqueous solution was increased by (1) adding of calcium hydroxide, or (2) adding of slag-immersed water, to precipitate a solid component containing calcium.

(1) Adding of Calcium Hydroxide (Experiment 1)

Calcium hydroxide was dissolved in water to prepare an aqueous solution of calcium hydroxide having a pH of 12.5 and a Ca ion concentration of 530 mg/L. The prepared aqueous solution of calcium hydroxide was added to 2 L of aqueous solution 1. The adding of 4.3 L of the aqueous solution of calcium hydroxide increased the pH to 8.5 by 2.1, and the adding of 4.5 L thereof increased the pH to 9.0 by 2.6.

(2) Adding of Slag-Immersed Water (Experiment 2)

Another steelmaking slag was stirred in water to obtain slag-immersed water 1. Slag-immersed water 1 had a pH of 12.2. Table 3 shows components contained in slag-immersed water 1 and the amount of each component, which were measured by IPC optical emission spectrometry. Slag-immersed water 1 was added to 2 L of aqueous solution 1. The adding of 6.9 L of slag-immersed water 1 increased the pH to 8.5 by 2.1.

[Table 3]

TABLE 3

| Component Ratio of Slag-immersed Water 1 | | | | | | | |
|---|---|---|---|---|---|---|---|
| | Component Amount (mg/L) | | | | | | |
| | Fe | Ca | Si | Mn | Mg | Al | P |
| Slag-immersed Water 1 | 0.2 | 240 | 1.5 | 0.3 | 0.1 | 18 | 0.0 |

Step 3-2: Precipitation of Calcium (Removal of Carbon Dioxide)

For a comparison, while keeping the measurement of the pH of aqueous solution 1 by a glass electrode method, a solid component containing calcium was precipitated by any one of the following methods: (3) blowing of air, (4) suspending of $N_2$, (5) pressure reduction and stirring, and (6) heating.

(3) Blowing of Air (Experiment 3)

Room air was blown into aqueous solution 1 at the rate of 2 L/min.

(4) Suspending of $N_2$ (Experiment 4)

Aqueous solution 1 was put in a container with a cover, and $N_2$ was poured into the upper space of the container where aqueous solution 1 is not present at the rate of 1 L/min. For suspending $N_2$ satisfactorily, a mill wheel was rotated at the liquid surface.

(5) Pressure Reduction and Stirring (Experiment 5)

Aqueous solution 1 was fed into a container and the container was tightly sealed. The pressure of the container was reduced so that the pressure of the air in the vicinity of the interface of aqueous solution 1 became a gauge pressure of 0.08 MPa, and at the same time, aqueous solution 1 was stirred using an impeller.

(6) Heating (Experiment 6)

Aqueous solution 1 was heated to 80° C. using a heater.

Step 4: Recovery of Solid Component

Each process of the steps 1 to 3-1, or 1 to 3-2 was independently performed multiple times. A solid component was recovered by pressure filtration of aqueous solution 1 containing the precipitated solid component using a filter when the pH of each aqueous solution 1 was increased by 0.3, 0.6, 1.1, 1.6, 2.1 or 2.6 (when the pH became 6.7, 7.0, 7.5, 8.0, 8.5 or 9.0 each). For aqueous solution 1 heated in experiment 6, a solid component was recovered from the solution by pressure filtration while heating is continued not to lower the liquid temperature.

Step 5: Calculation of Recovery Rate of Calcium Contained in Solid Component

The calcium concentration in the recovered solid component was measured by IPC optical emission spectrometry. The calcium amount measured by the IPC optical emission spectrometry was divided by the amount of calcium contained in aqueous solution 1 to determine the recovery rate of calcium. It is to be noted that, in the cases of the increasing the pH by adding of calcium hydroxide (Experiment 1) and adding of slag-immersed water (Experiment 2), the calcium amount measured by the IPC optical emission spectrometry included calcium contained in the added aqueous solution of calcium hydroxide and slag-immersed water 1, respectively. Accordingly, the recovery rate of calcium for experiments 1 and 2 each was determined by dividing the calcium amount measured by the IPC optical emission spectrometry by the sum of the amounts of calcium contained in aqueous solution 1 and in slag-immersed water 1.

Step 6: Obtainment of Results

Table 4 shows conditions for precipitation of calcium, the pH of aqueous solution 1 at the time of solid component recovery, and the recovery rate of calcium.

[Table 4]

TABLE 4

Conditions for Increasing pH, pH and Recovery Rate of Calcium of Aqueous Solution 1

| Experiment | | Increasing Value of pH and Recovery Rate of Calcium (%) | | | | | | |
|---|---|---|---|---|---|---|---|---|
| No. | Method for Increasing pH | pH 0.3 | pH 0.6 | pH 1.1 | pH 1.6 | pH 2.1 | pH 2.6 | Remarks |
| 1 | (1) Adding of Calcium Hydroxide | 3.9 | 52.9 | 82.7 | 91.3 | 95.0 | 96.8 | Example |
| 2 | (2) Adding of Slag-immersed Water | 1.2 | 34.7 | 78.6 | 90.0 | 92.2 | — | Example |
| 3 | (3) Blowing of Air | 2.8 | 37.2 | 83.8 | 93.1 | 95.7 | — | Comparative Example |
| 4 | (4) Suspending of $N_2$ | 3.0 | 38.6 | 84.5 | 92.3 | 96.0 | — | Comparative Example |
| 5 | (5) Pressure Reduction and Stirring | 0.3 | 0.5 | 79.9 | 94.1 | 95.8 | — | Comparative Example |
| 6 | (6) Heating | 0.7 | 91.1 | — | — | — | — | Comparative Example |

* "—"is an indication of an experiment not performed

As shown in Table 4, increasing of the pH of aqueous solution 1 enabled obtainment of a solid component containing calcium. A larger increasing value of the pH could achieve a high recovery rate as high as 90% or more. In particular, increasing of the pH by 0.6 or more, 1.1 or more and 1.6 or more could recover respective 35% or more, 75% or more and 90% or more of calcium. The recovery rate of calcium by adding an alkaline substance was as high as that of calcium by another method (removal of carbon dioxide).

Further, the pH of the aqueous solution could be easily increased by increasing the amount of the alkaline substance to be fed.

Table 5 shows the pH at the time of recovery and the composition of a representative solid component obtained by each method, for the purpose of reference.

[Table 5]

TABLE 5

Method for Increasing pH, pH at the time of Recovery, and Composition of Solid Component

| Experiment | | Increasing | Component Ratio (mass %) | | | | | | |
|---|---|---|---|---|---|---|---|---|---|
| No. | Method for Increasing pH | Value of pH | Fe | Ca | Si | Mn | Mg | Al | P |
| 1 | (1) Adding of Calcium Hydroxide | +2.6 | 0.1 | 45 | 0.3 | 0.8 | 0.2 | 0.2 | 0.41 |
| 2 | (2) Adding of Slag-immersed Water | +2.1 | 0.4 | 36.7 | 5.2 | 0.8 | 0.1 | 2.7 | 0.2 |
| 3 | (3) Blowing of Air | +2.1 | 0.3 | 38.5 | 1.1 | 1.8 | 0.2 | 0.2 | 0.3 |
| 4 | (4) Suspending of $N_2$ | +2.1 | 0.2 | 37.9 | 1.3 | 1.8 | 0.2 | 0.1 | 0.4 |
| 5 | (5) Pressure Reduction and Stirring | +2.1 | 0.2 | 39.6 | 0.9 | 1.8 | 0.2 | 0.2 | 0.3 |
| 6 | (6) Heating | +0.6 | 0.3 | 40.3 | 0.6 | 1.5 | 0.2 | 0.1 | 0.3 |

[Experiments 7 to 9]

In experiments 7 to 9, removal of carbon dioxide and increasing of the pH are combined and performed.

Step 1: Immersion of Steelmaking Slag in Aqueous Solution Containing Carbon Dioxide Steelmaking slag was immersed in an aqueous solution containing carbon dioxide by the same procedure as in experiment 1.

Step 2: Separation of Steelmaking Slag and Aqueous Solution

By the same procedure as in experiment 1, the aqueous solution containing carbon dioxide was separated from the steelmaking slag to recover a supernatant. The supernatant was filtered using a filter to remove floating substances and recover an aqueous solution (hereinafter referred to as "aqueous solution 2"). Table 6 shows components contained in aqueous solution 2 and the amount of each component, which were measured by IPC optical emission spectrometry. Aqueous solution 2 had a pH of 6.3.

[Table 6]

TABLE 6

| Component Ratio of Aqueous Solution 2 | | | | | | | |
|---|---|---|---|---|---|---|---|
| | Component Amount (mg/L) | | | | | | |
| | Fe | Ca | Si | Mn | Mg | Al | P |
| Aqueous Solution 2 | 27 | 880 | 160 | 29 | 19 | 0.4 | 5.1 |

Step 3-1: Precipitation 1 of Calcium (Experiment 7)

Another steelmaking slag was stirred in water to obtain slag-immersed water 2. Slag-immersed water 2 had a pH of 11.9. Table 7 shows components contained in slag-immersed water 2 and the amount of each component, which were measured by IPC optical emission spectrometry.

[Table 7]

TABLE 7

| Component Ratio of Slag-immersed Water 2 | | | | | | | |
|---|---|---|---|---|---|---|---|
| | Component Amount (mg/L) | | | | | | |
| | Fe | Ca | Si | Mn | Mg | Al | P |
| Slag-immersed Water 2 | 0.1 | 150 | 1.0 | 0.1 | 0.2 | 10 | 0.0 |

Room air was blown at the rate of 2 L/min into 2 L of aqueous solution 2 fed into a container. When the pH became 7.3, the blowing of air was stopped and slag-immersed water 2 was added to 2 L of aqueous solution 2. The adding of 0.5 L of slag-immersed water 2 increased the pH to 8.5 by 2.2.

Step 3-2: Precipitation 2 of Calcium (Experiment 8)

Air in the laboratory was blown at the rate of 2 L/min into 2 L of aqueous solution 2 filling a container. When the pH became 6.7, a solid component precipitated at that time was recovered by filtration, and subsequently air was further blown at the rate of 20 L/min. When the pH became 7.5, the blowing of air was stopped and slag-immersed water 2 was added to 2 L of aqueous solution 2. The adding of 0.5 L of slag-immersed water 2 increased the pH to 8.5 by 2.2.

Step 3-3: Precipitation 3 of Calcium (Experiment 9)

Aqueous solution 2 filling a container is heated to 80° C. When the pH became 6.6, a solid component precipitated at that time was recovered by filtration, and subsequently air was blown at the rate of 3 L/min. When the pH became 7.5, the blowing of air was stopped and slag-immersed water 2 was added to 2 L of aqueous solution 2. The adding of 0.4 L of slag-immersed water 2 increased the pH to 8.5 by 2.2.

Step 4: Recovery of Solid Component

Each process of steps 1 to 3-1, 1 to 3-2 or 1 to 3-3 was independently performed multiple times. In each experiment, a solid component was recovered by vacuum filtration of aqueous solution 2 containing the precipitated solid component using a filter when the pH of aqueous solution 1 was increased by 0.3, 0.4, 0.7, 1.2, 1.7 or 2.2 (when the pH became 6.6, 6.7, 7.0, 7.5, 8.0 or 8.5 each).

Step 5: Calculation of Recovery Rate of Calcium Contained in Solid Component

The calcium concentration in the recovered solid component was measured by IPC optical emission spectrometry. The calcium amount measured by the IPC optical emission spectrometry was divided by the amount of calcium contained in aqueous solution 2 to determine the recovery rate of calcium. The recovery rate of calcium for experiments 7, 8 and 9 each, in which slag-immersed water 2 was added, was determined by dividing the calcium amount measured by the IPC optical emission spectrometry by the sum of the amounts of calcium contained in aqueous solution 2 and in slag-immersed water 2. Further, for experiments 8 and 9 each, in which the recovery was performed twice as in an early stage precipitate and a later stage precipitate, the recovery rate was determined on the basis of the sum of the calcium concentrations in the early stage precipitate and the later stage precipitate.

Step 6: Obtainment of Result 1; Recovery Rate of Calcium

Table 8 shows conditions for precipitation of calcium, the pH of aqueous solution 2 at the time of solid component recovery, and the recovery rate of calcium.

[Table 8]

TABLE 8

| Conditions for Precipitation of Calcium, pH of Aqueous Solution 2 and Recovery Rate of Calcium | | | | | | | | |
|---|---|---|---|---|---|---|---|---|
| Experiment | | Increasing Value of pH and Recovery Rate of Calcium (%) | | | | | | |
| No. | Method for Precipitating Calcium | pH 0.3 | pH 0.4 | pH 0.7 | pH 1.2 | pH 1.7 | pH 2.2 | Remarks |
| 7 | Blowing of Air (until pH 7.3) ↓ Adding of Slag-immersed Water ↓ Recovery of Solid Component (First Time) | — | 2.4 | 52.9 | 82.7 | 91.3 | 94.0 | Example |

TABLE 8-continued

Conditions for Precipitation of Calcium, pH of Aqueous Solution 2 and Recovery Rate of Calcium

| Experiment No. | Method for Precipitating Calcium | Increasing Value of pH and Recovery Rate of Calcium (%) | | | | | | Remarks |
|---|---|---|---|---|---|---|---|---|
| | | pH 0.3 | pH 0.4 | pH 0.7 | pH 1.2 | pH 1.7 | pH 2.2 | |
| 8 | Blowing of Air (until pH 6.7) ↓ Recovery of Solid Component (Early Stage Precipitate) ↓ Blowing of Air (until pH 7.5) ↓ Adding of Slag-immersed Water ↓ Recovery of Solid Component (Later Stage Precipitate) | — | 2.5 | 53.5 | 83.2 | 91.9 | 94.5 | Example |
| 9 | Heating (until pH 6.6) ↓ Recovery of Solid Component (Early Stage Precipitate) ↓ Blowing of Air (until pH 7.5) ↓ Adding of Slag-immersed Water ↓ Recovery of Solid Component (Later Stage Precipitate) | 1.0 | — | 51.2 | 80.9 | 92.0 | 95.5 | Example |

As shown in Table 8, a combination of different methods for precipitating calcium could also recover calcium in a high recovery rate.

Step 7: Obtainment of Result 2; Calcium Recovery without Phosphorus

Table 9 shows the amounts of phosphorus contained in solid components (early stage precipitates) recovered at pH 6.7 in experiment 8 and at pH 6.6 in experiment 9, and solid components (final precipitates) recovered at pH 8.5 in experiments 7 to 9.

[Table 9]

TABLE 9

Amount of Phosphorus precipitated in Experiments 7 to 9

| | Early Stage Precipitate | | |
|---|---|---|---|
| Experiment No. | Increasing Value of pH | Amount of Phosphorus (mass %) | Final Precipitate Amount of Phosphorus (mass %) |
| 7 | — | — | 0.28 |
| 8 | +0.4 | 9.1 | 0.01 |
| 9 | +0.3 | 12.6 | 0.01 |

As shown in Table 9, a solid component with a high phosphorus content and a solid component with a low phosphorus content could be recovered separately by recovering an early stage precipitate before increasing the pH by 1.0, and subsequently recovering a later stage precipitate after further increasing the pH.

[Experiment 10]

Experiment 10 is another example in which removal of carbon dioxide and increasing of the pH are combined and performed.

Step 1: Immersion of Steelmaking Slag in Water

Steelmaking slag was satisfactorily stirred in water, followed by separation of the steelmaking slag by filtration to obtain slag-immersed water 3. Components contained in slag-immersed water 3 and the amount of each component were measured by IPC optical emission spectrometry.

Step 2: Immersion of Steelmaking Slag in Aqueous Solution Containing Carbon Dioxide The steelmaking slag separated from slag-immersed water 3 was immersed in an aqueous solution containing carbon dioxide by the same procedure as in experiment 1.

Step 3: Separation of Steelmaking Slag and Aqueous Solution

By the same procedure as in experiment 1, the aqueous solution containing carbon dioxide was separated from the steelmaking slag to recover a supernatant. The supernatant was filtered using a filter to remove floating substances and recover an aqueous solution (hereinafter referred to as "aqueous solution 3"). Components contained in aqueous solution 3 and the amount of each component were measured by IPC optical emission spectrometry.

Step 4: Precipitation of Calcium

Room air was blown at the rate of 3 L/min into 3 L of aqueous solution 3 fed into a container, while keeping the measurement of the pH of the aqueous solution by a glass electrode method. After blowing the air into the aqueous solution for 15 minutes, slag-immersed water 3 was added thereto. At each of the times of 5 min, 10 min, 15 min and 30 min after the start of air blowing, and when the amount of the added slag-immersed water per liter of aqueous solution 3 became 0.1 L, 0.24 L, 0.4 L and 0.6 L, a portion of aqueous solution 3 was collected to measure the calcium dissolution amount of aqueous solution 3 by IPC optical emission spectrometry.

Figure 6:
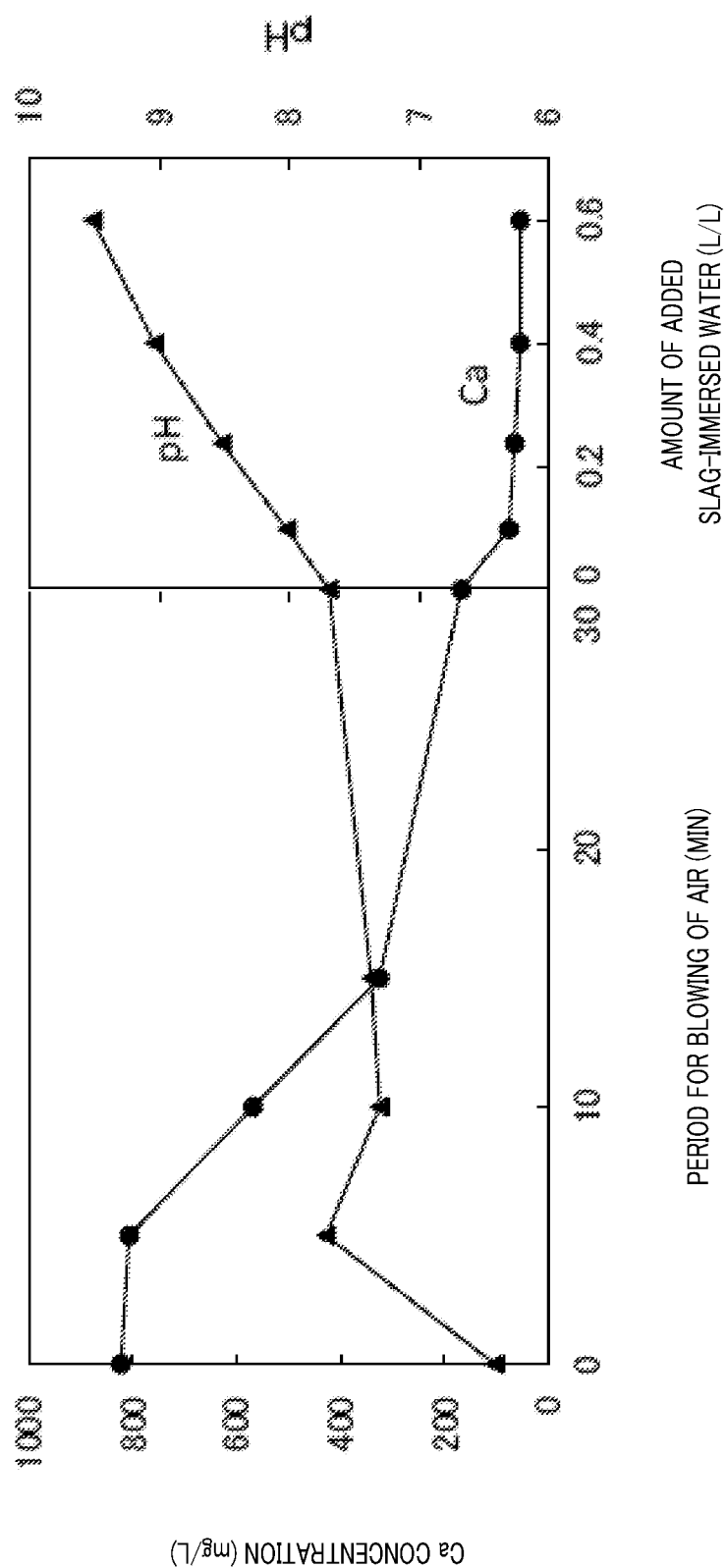
FIG. 6 is a graph showing change of the pH and the calcium dissolution amount in aqueous solution 3 of example 10.

FIG. 6 is a graph showing the pH and the calcium dissolution amount of the each collected aqueous solution. Removal of carbon dioxide by the blowing of air caused precipitation of calcium, and resulting reduction of the calcium dissolution amount. The adding of the slag-immersed water thereafter caused further precipitation of calcium, and thus the calcium dissolution amount had rapidly decreased.

Table 10 shows components contained in each of slag-immersed water 3, aqueous solution 3 before the blowing of air thereto (referred to as "before precipitation" in Table 10) and aqueous solution 3 after 0.6 L of slag-immersed water per liter of the aqueous solution was added thereto (referred to as "after precipitation" in Table 10), and the amount of each component, which were measured by IPC optical emission spectrometry.

[Table 10]

TABLE 10

Component Ratios of Slag-immersed Water 3,
Aqueous Solution 3 (Before Precipitation) and
Aqueous Solution 3 (After Precipitation)

| | Component Amount (mg/L) | | | | | |
|---|---|---|---|---|---|---|
| | Fe | Ca | Si | Mn | Mg | Al | P |
| Slag-immersed Water 3 | tr | 140 | tr | tr | 0.2 | 15 | tr |
| Aqueous Solution 3 (Before Precipitation) | 25 | 825 | 159 | 29 | 18 | 0 | 2.2 |
| Aqueous Solution 3 (After Precipitation) | tr | 53 | 43 | tr | 12 | 0.2 | tr |

* "tr" is an indication of "trace"

The method of the present invention could easily precipitate a large portion of calcium which was eluted from steelmaking slag to be contained in each of slag-immersed water 3 and aqueous solution 3 before precipitation. Eventually, 94.5% of calcium ((140+825−53)/(140+825)) was precipitated. The aqueous solution 3 after precipitation had the content of each component as shown in Table 10 which was at approximately the same level as that of drinkable well water, and could have been reused without being subjected to waste water treatment.

INDUSTRIAL APPLICABILITY

The recovery method of calcium of present invention can easily increase the recovery rate of calcium present in steelmaking slag, and thus is particularly advantageous as, e.g., a method for recovering a calcium source in iron making.

This application claims priority based on Japanese Patent Application No. 2015-059468, filed on Mar. 23, 2015, the entire contents of which including the claims, the specification and the drawings are incorporated herein by reference.

The invention claimed is:

1. A method for recovering a solid component containing calcium from steelmaking slag, the method comprising:
   immersing the steelmaking slag in an aqueous solution containing carbon dioxide;
   separating the immersed steelmaking slag from the aqueous solution;
   increasing the pH of the aqueous solution separated from the steelmaking slag to precipitate the solid component containing calcium;
   recovering the solid component containing calcium; and
   removing the carbon dioxide from the aqueous solution separated from the steelmaking slag by introducing, into the aqueous solution from which the steelmaking slag has been separated, a gas having a partial pressure of carbon dioxide lower than an equilibrium pressure of carbon dioxide in the aqueous solution separated from the steelmaking slag, wherein the removing is performed by:
   removing the carbon dioxide from the aqueous solution separated from the steelmaking slag, prior to the increasing the pH of the aqueous solution;
   removing the carbon dioxide from the aqueous solution separated from the steelmaking slag, during the increasing the pH of the aqueous solution; or
   removing the carbon dioxide from the aqueous solution separated from the steelmaking slag and having the increased pH, after the increasing the pH of the aqueous solution and prior to the recovering the solid component containing calcium.

2. The method according to claim 1, wherein the increasing the pH includes increasing the pH of the aqueous solution by 0.2 or more.

3. The method according to claim 1, wherein the increasing the pH includes increasing the pH of the aqueous solution by adding an alkaline substance into the aqueous solution.

4. The method according to claim 3, wherein the adding the alkaline substance includes:
   adding slag-immersed water, which is obtained by immersing steelmaking slag in water, to the aqueous solution.

5. The method according to claim 4, further comprising:
   prior to the immersing the steelmaking slag in the aqueous solution, obtaining the slag-immersed water which is obtained by immersing the steelmaking slag that is to be immersed in the aqueous solution containing carbon dioxide, or obtained by immersing another steelmaking slag in the water in water.

6. The method according to claim 1, further comprising, during the removing carbon dioxide, recovering a solid component precipitated before the pH of the aqueous solution increases by 1.0.

7. A method for recovering a solid component containing calcium from steelmaking slag, the method comprising:
   immersing the steelmaking slag in an aqueous solution containing carbon dioxide;
   separating the immersed steelmaking slag from the aqueous solution;
   increasing the pH of the aqueous solution separated from the steelmaking slag to precipitate a solid component containing calcium, wherein the increasing the pH of the aqueous solution is performed by adding slag-immersed water to the aqueous solution separated from the steelmaking slag, and wherein the slag-immersed water is obtained by immersing in water the steelmaking slag that is to be immersed in the aqueous solution containing carbon dioxide, or obtained by immersing another steelmaking slag in the water; and
   recovering the solid component containing calcium.

8. The method according to claim 7, further comprising, removing carbon dioxide from the aqueous solution, by introducing, into the aqueous solution, a gas having a partial pressure of carbon dioxide lower than an equilibrium pressure of carbon dioxide in the aqueous solution;
   wherein the removing is performed after the separating and prior to the increasing the pH, during the increasing the pH, or after the increasing the pH and prior to the recovering the solid component containing calcium.

* * * * *